United States Patent [19]

Sulzbach et al.

[11] 4,078,135

[45] Mar. 7, 1978

[54] PROCESS FOR THE MANUFACTURE OF SUSPENSION POLYMERS OF TETRAFLUOROETHYLENE

[75] Inventors: Reinhard Sulzbach; Jürgen Kuhls, both of Burghausen, Salzach; Herbert Fitz, Burgkirchen, Alz, all of Germany

[73] Assignee: Hoechst Aktiengesellschaft, Frankfurt am Main, Germany

[21] Appl. No.: 688,239

[22] Filed: May 20, 1976

[30] Foreign Application Priority Data

Apr. 23, 1976 Germany .............................. 2617829

[51] Int. Cl.$^2$ ...................... C08F 14/26; C08F 114/26

[52] U.S. Cl. ................................... 526/209; 264/148; 526/247; 526/255; 528/502

[58] Field of Search ...................... 526/209, 247, 255; 528/502; 264/148

[56] References Cited

U.S. PATENT DOCUMENTS 3,450,684   6/1969   Darby .................................. 526/247

*Primary Examiner*—Harry Wong, Jr.
*Attorney, Agent, or Firm*—Connolly and Hutz

[57] ABSTRACT

Polymers of tetrafluoroethylene are produced by suspension polymerization in the presence of small amounts of definite perfluorinated ethers. The products obtained have improved processing properties.

4 Claims, No Drawings

PROCESS FOR THE MANUFACTURE OF SUSPENSION POLYMERS OF TETRAFLUOROETHYLENE

Copending application, Ser. No. 688,234 filed concurrently herewith (on May 20, 1976) provides a process for polymerizing tetrafluoroethylene by the suspension method in the presence of the usual catalysts and optionally buffer substances, precipitating agents and small amounts of emulsifiers and heavy metal salts, which comprises polymerizing the tetrafluoroethylene in the presence of from 0.0004 to 0.0029 mol %, calculated on the monomer used, of a perfluorinated ether of the formula

$CF_2=CF—O—R_f$ in which $R_f$ represents a perfluoralkyl radical having from 1 to 10 carbon atoms, or of the formula

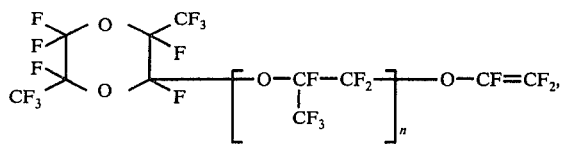

in which $n$ is zero to 4, or of a mixture of the said perfluorinated ethers as modification agent.

The present invention relates to a process for the manufacture of polymers of tetrafluoroethylene having improved processing properties by suspension polymerization.

Polytetrafluoroethylene produced in suspension according to the processes of the state of the art has a high tendency to crack formation which cannot be overcome even by fine grinding. It is, therefore, desirable to provide an improved tetrafluoroethylene polymer which, when processed into sintered blocks and other thick-walled objects, is completely or substantially free from the tendency to crack formation without the other properties, especially those which are important to the manufacture of sliced sheets, being affected.

It is the object of the present invention to provide a process for polymerizing tetrafluoroethylene by the suspension method in the presence of the usual catalysts and optionally buffer substances, precipitating agents and small amounts of emulsifiers and heavy metal salts, which comprises polymerizing the tetrafluoroethylene in the presence of from 0.004 to 0.0029 mol %, calculated on the monomer used, of a perfluorinated ether of the formula I

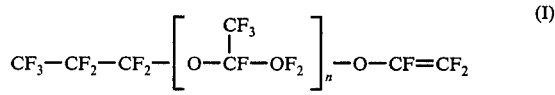
(I)

in which $n$ is 1 to 4, or a mixture of such perfluorinated ethers with different values for $n$ as modification agent.

The amount of perfluorinated vinyl ether of formula (I) in which $n$ is 1 to 4, preferably 1 or 2 to be used as modification agent should be in the range of from 0.0004 to 0.0029, preferably 0.001 to 0.0025, and more preferably 0.001 to 0.0020 mol %, calculated on the tetrafluoroethylene used.

Perfluorinated vinyl ethers of the formula (I) can be prepared according to German Patent 1,263,749 by thermolysis of a compound of the formula

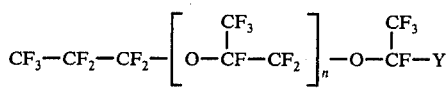

in which $n$ is 1 to 4 and Y represents —COF or —COOMe (Me being a monovalent metal, preferably an alkali metal). These derivatives of perfluorinated ether-carboxylic acids can be prepared by oligomerization of hexafluoropropene oxide, for example, as described in British Pat. Nos. 928,315 and 1,033,574.

The ethers of formula (I) can be used in pure form or in the form of mixtures of ethers having different values for $n$. Alternatively, the modification agents of formula (I) can be used in admixture with perfluorinated ethers of the following formulae (II) or (III) in the amounts as defined above, which ethers are claimed in our copending application referred to above

$CF_2=CF—O—R_f$ (II)

in which $R_f$ represents a perfluoroalkyl radical having from 1 to 10 carbon atoms or

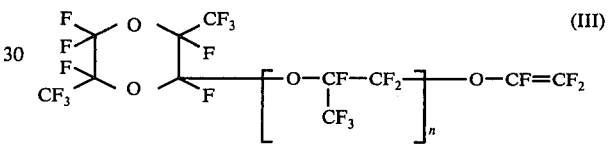
(III)

in which $n$ is zero to 4.

It proved advantageous to add the total amount of the modification agent in dosed quantities as soon as the required polymerization pressure is reached. It is likewise possible to introduce a partial amount into the vessel prior to the beginning of polymerization and to meter in the balance, or the total amount is metered in when up to 70%, preferably up to 30% of the tetrafluoroethylene are polymerized. Either continuous or batchwise addition being possible.

The suspension polymerization in accordance with the present invention is carried out under conventional conditions. Catalysts to be used are presulfates, percarbonates, perborates, peroxides, per-acids, azo-compounds, or also permanganates (cf. U.S. Pat. Nos. 2,393,967; 2,394,243; 2,471,959; 2,510,783; 2,515,628; 2,520,338; 2,534,058, 2,565,573; 2,599,299; 3,632,847). There may also be used redox catalysts systems comprising one of the aforesaid peroxidic compounds (cf. U.S. Pat. No. 2,393,967, left hand column on page 3, lines 22 et seq.), especially persulfate with a reducing component such as bisulfite, hydrazin, dithionite, or a water-soluble nitrogen compound liberating a diimine, for example, azodicarboxylic acid and the salts thereof, or azodicarbonamide.

The polymerization is suitably carried out at a pressure in the range of from about 0.5 to 20, preferably 3 to 10 atmospheres gage and at temperatures in the range of from about 5° to 90° C, preferably 10° to 35° C. The pH of the polymerization medium is not critical, it can be acid, neutral or alkaline. When permanganates or azo-compounds are used, an acid medium is preferably used, with all other catalysts an alkaline medium being preferred.

If desired, the polymerization can be carried out in the presence of small amounts of buffer substances, especially ammonium salts, for example, ammonium carbaminate, ammonium carbonate, ammonium chloride, or ammonium oxalate. Known precipitating agents may also be added, for example borax or inorganic water-soluble phosphates. To facilitate catalyst decomposition small amounts of heavy metal salts may be added in a concentration of from $1 \times 10^{-5}$ to $40 \times 10^{-5}$, preferably $3 \times 10^{-5}$ to $20 \times 10^{-5}\%$ by weight, calculated on the total aqueous mixture, for example, the salts of bivalent copper, bi- or trivalent iron, trivalent chromium, or monovalent mercury.

In certain cases it proved advantageous to add to the polymerization mixture small amounts of telogenically inactive emulsifiers, for example, salts of perfluorinated carboxylic acids. The concentration of such emulsifiers should, however, be below the amount necessary for emulsion formation, suitably it is below 30 ppm, preferably below 20 ppm.

It has surprisingly been found that with the use of extremely small quantities of the specified modification agents according to the invention the tendency to crack formation of molded and sintered blocks is so drastically reduced that sintered blocks of an absolutely unusual weight of up to 80 kg (corresponding to a diameter of up to 40 cm) can be produced which are free from crack formation. The blocks obtained can be used for the manufacture of sliced sheets of excellent quality.

The products produced by the process of the invention have surprising advantages over pure non-modified polytetrafluoroethylene and surprisingly they also have advantages over products produced with higher amounts of the modification agents to be used according to the invention (over 0.0029 mol %).

As compared to unmodified polytetrafluoroethylene, the products of the invention exhibit the following advantages:

(1) Large blocks which are free from cracks and suitable for making sliced sheets can be produced by molding and sintering. The sheets have a good quality throughout the whole diameter of large blocks.

(2) Surprising improvement in the transparency of the sheets in spite of the extremely small amount of modification agent used.

(3) Improved thermostability of the sheets as a result of the variation of density after thermal treatment.

As compared to products produced with larger amounts (over 0.0029 mol %) of the perfluorinated modification agents (for example according to British Patent 1,116,210), the products of the invention exhibit the following advantages:

(1) Larger blocks free from cracks can be produced by molding and sintering. It is surprising that with the use of higher amounts of modification agent an increased crack formation is observed, so that for crack formation the optimum concentration of modification agent is below 0.0029 mol %, preferably below 0.0020 mol %, calculated on tetrafluoroethylene used. This fact is illustrated by Table 1.

(2) The products obtained have improved mechanical properties. It has been observed that the tensile strength of the sintered material is distinctly diminished when the amount of modification agents exceeds the aforesaid value.

(3) Better electrical properties of the sheets sliced from the outer zones of the sintered blocks. In this case, too, a higher amount of modification agent detrimentally affects the dielectric strength in the border zones of the blocks.

(4) Better grinding properties. It has been observed that products modified with a higher amount of perfluorinated ether have poorer grinding properties on the usual air jet and hammer mills. As a result thereof, the powders obtained have a lower apparent density than unmodified polytetrafluoroethylene powders. The sliced sheets made therefrom have areas of different transparency (specks and white spots). These disadvantages are not observed when the small amounts of modification agent according to the invention are used.

Table 1

Crack formation in sintered blocks of 14 kg made from modified polytetrafluoroethylene Modification agent $CF_3-CF_2-CF_2-O-CF-CF_2-O-CF=CF_2$
$\phantom{CF_3-CF_2-CF_2-O-}|$
$\phantom{CF_3-CF_2-CF_2-O-}CF_3$ (compound (I) with n=1)

| Example No. | modification agent x) weight ppm | mol ppm | crack formation from diameter++) |
|---|---|---|---|
| A comparative example without modification agent | 0 | 0 | 40 mm |
| 1 according to invention | 50 | 12 | none |
| 2 according to invention | 100 | 23 | none |
| B) comparative example )with high content of | 200 | 46 | 50 mm |
| C) modification agent | 300 | 69 | 105 mm | x) calculated on tetrafluoroethylene used
++) when a block having a diameter of 20 cm is sliced crack formation is observed from the indicated diameter on towards the center the cylindrical blocks (height 21 cm. diameter 20 cm) were compressed at 150 kg:cm², heated at a rate of 22° C per hour, maintained at 380° C for 12 hours and then cooled at a rate of 22° C per hour.

The following examples illustrate the invention.

EXAMPLES 1 AND 2, COMPARATIVE EXAMPLE A TO C (CF. TABLE 1)

(a) Suspension Polymerization

The polymerization autoclave used had a capacity of 250 l and an enamel inside lining and was provided with impelter and baffle. It was charged with 210 liters of desalted water and the following additives:

0.84 g (4 ppm by weight, calculated on aqueous medium) of potassium perfluoro($\beta$-propoxypropionate) as emulsifier 210 g (1,000 ppm by weight) of ammonium carbaminate 18.6 ml of $CuSO_4$ (2% strength)

The stirrer was switched on at a speed of 100 revolutions per minute, the autoclave was repeatedly flushed with nitrogen and two times with tetrafluoroethylene and tetrafluoroethylene was forced in up to the desired pressure of 4.5 atmospheres gage. After increase of the stirrer speed to 180 revolutions per minute, the following components were metered in by a dosing pump the perfluorinated vinyl ether of formula (I) with $n = 1$ in the concentrations indicated in Table 1, calculated on tetrafluoroethylene used 1,600 mg azodicarbonamide dissolved in 18 ml 10% NaOH and 6.4 g of ammonium persulfate Polymerization was carried out at 4.5 atmospheres gage and 15° C until a solids content of about 25% by weight, calculated on the polymerization mixture had been reached.

(b) Processing

The pressure of the polymerization vessel was released and the vessel was flushed three times with nitrogen (4 to 5 atmospheres gage). The aqueous medium was discharged and in the polymerization autoclave the polymer was washed three times, each time with 100 liters fully desalted water at a stirring speed of 150 revolutions per minute. Next, about 1/5 of the polymer was ground two times in a 100 liter glass vessel with intermediate water replacement, each time with 50 liters of fully desalted water for 2 to 3 minutes, to an average particle size of 200 to 400 μm. Wash water in excess was removed in a straining bowl and the product was dried in a layer of 5 to 7 cm for 6 hours at 240° C in a drying cabinet with circulating air. The dried product was ground in a helical jet mill to an average particle size of 20 to 70 μm.

| Ex. No. | c) Product properties spec. gravity g/cc | tensile strength N/mm² | elongat. at break % | dielectrical strength KV/mm | | |
|---|---|---|---|---|---|---|
| | | | | point 1 | 2 | 3 |
| 1 | 2.151 | 34 | 430 | 79 | 88 | 85 |
| 2 | 2.148 | 32 | 430 | 89 | 90 | 89 |
| B | 2.147 | 31 | 420 | 79 | 81 | 76 |
| C | 2.145 | 30.5 | 410 | 66 | 82 | 0 |

The products produced by Examples 1 and 2 had a processing range of from 360° to 410° C and an average molecular weight of $9.10^6$.

(d) Measuring methods (1) Processing range: the heating and cooling periods were the same as specified at the bottom of Table 1. The indicated temperature range includes the possible rest temperatures within which the sliced sheet did not exhibit oversintering (mottles) and had a tensile strength 30 kg/cm².

(2) Molecular weight: the molecular weight was measured by the traction-creeping method according to C. Airoldi (of. C. Airoldi, C. Carbuglio and M. Ragazzini, J. appl. Polym. Sc. volume 14, pages 79 zo 88 (1970)).

(3) Specific gravity: it was measured with disks having a diameter of 25 mm which had been compressed at 352 bars and sintered for 1 hour at 380° C by the buoyancy method at 23° C.

(4) Dielectric strength: the block having a weight of 14 kg (dimensions: about 20 cm heigh and about 20 cm in diameter) was sliced from the outside towards the center into a sheet having a thickness of 200 μ. The dielectric strength was tested with a dielectric strength tester. Point 1 corresponds to the slicing range of from 190 to 173 mm, point 2 to the slicing range of from 149 to 130 mm and point 3 to 77 to 56 mm of the block diameter.

The dielectric strength tester used was a device of Messrs. MeBwandler Bau GmbH, Bamberg, type JPG 30/0.5 (electrodes: on top ball electrode diameter 20 mm, at bottom plate electrodes diameter 50 mm; according to VDE 0303/T2 or DIN 53 481. The average value was calculated from at least 10 individual values. Values below 75% of the second highest value were discarded. The number of individual values used to calculate the average value must amount to at least 70% of all individual values.

(6) Tensile strength and elongation at break: were measured according to ASTM D 1457 - 62 T with test bars according to ASTM D 1708. The indicated values are average values of 10 measurements on sliced sheets of different zones of the 14 kg block.

What is claimed is:

1. In the process of polymerizing tetrafluoroethylene by the suspension process in the presence of a usual catalyst and optionally buffer substances, precipitating agents, small amounts of emusifiers and heavy metal salts, the improvement which comprises conducting the suspension polymerization in the presence of from 0.0004 to 0.0029 mol %, calculated on the tetrafluoroethylene used, of at least one perfluorinated ether having the formula:

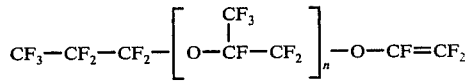

in which n is 1 to 4.

2. The process as claimed in claim 1, wherein the perfluorinated ether is present during the suspension polymerization in an amount of from 0.001 to 0.0020 mol %, calculated on tetrafluoroethylene used.

3. The process as claimed in claim 1, wherein n stands for 1 or 2.

4. In the method of producing shaped articles of modified polytetrafluoroethylene by molding, sintering and ram extruding modified polytetrafluoroethylene the improvement of obtaining shaped articles free from cracks which comprises molding, sintering and ram extruding modified polytetrafluoroethylene obtained by the process of claim 1.

* * * * *